March 13, 1934.    J. B. BROWN    1,950,474
VACUUM BRAKE
Filed Oct. 2, 1929    2 Sheets-Sheet 1
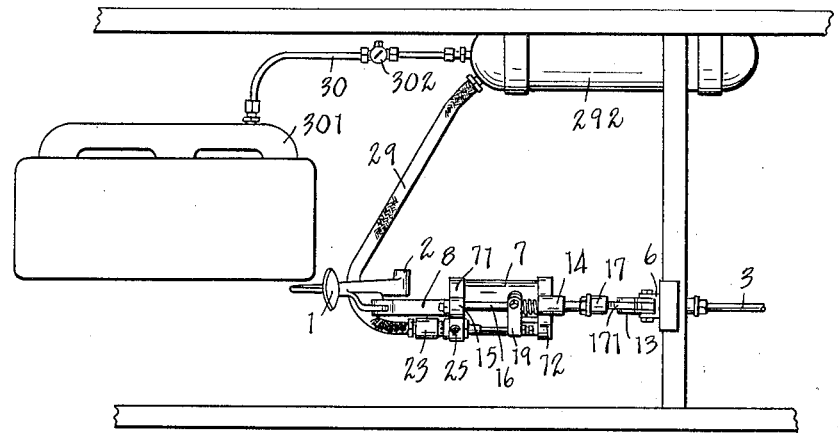
Fig. 1
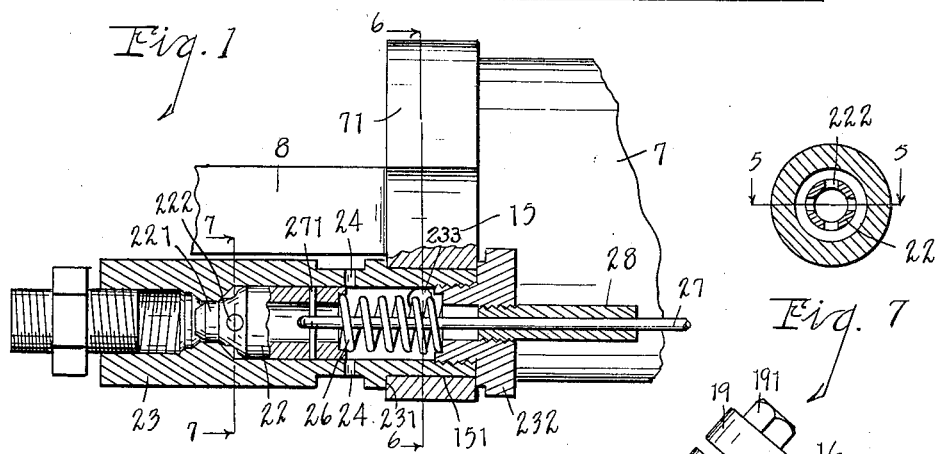
Fig. 5
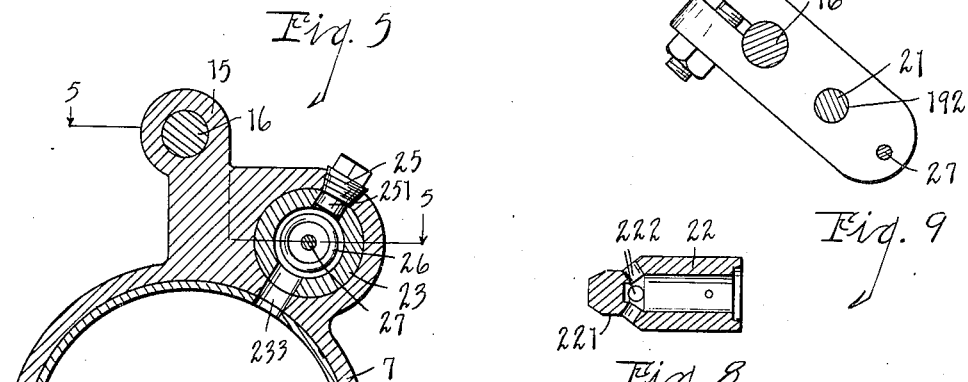
Fig. 7
Fig. 8
Fig. 9
Fig. 6
INVENTOR
Jesse B. Brown
Chappell & Earl
ATTORNEYS

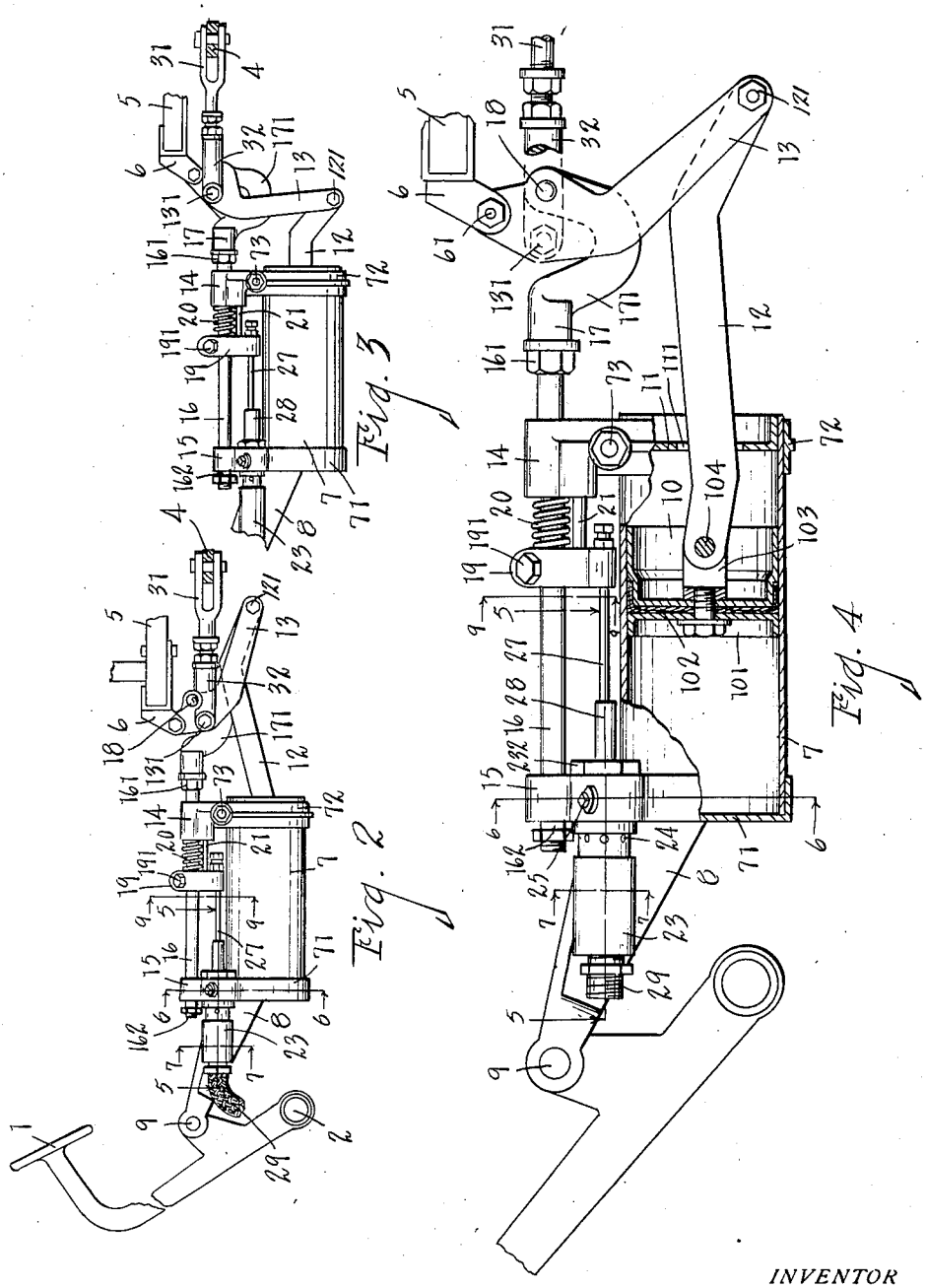

Patented Mar. 13, 1934

1,950,474

UNITED STATES PATENT OFFICE 1,950,474

VACUUM BRAKE

Jesse B. Brown, Detroit, Mich., assignor to Velvet Power Brake Company, Detroit, Mich.

Application October 2, 1929, Serial No. 396,616

8 Claims. (Cl. 188—152)

This application is a continuation in part of the patent application filed by applicant on Mar. 18, 1929, Serial No. 347,849.

The objects of the invention are:

First, to provide an improved auxiliary connection between a lever and a brake mechanism or part controlled.

Second, to provide improved means of utilizing vacuum control for such structures in automobiles.

Third, to provide such a structure in which the application of the power is under control and can be applied gradually or promptly as required, depending on the manipulation of the lever itself and automatic connections.

Fourth, to provide improved auxiliary intermediate compound lever connections for such a structure.

Fifth, to provide in such a structure improved auxiliary vacuum means.

Objects pertaining to details and economies of construction and operation will definitely appear from the description to follow. A preferred embodiment of my invention is illustrated in the accompanying drawings, in which:

Fig. 1 is a diagrammatic plan view of my improved brake structure, the frame of the automobile being conventional and parts broken away.

Fig. 2 is a side elevation view of a brake lever connection means embodying the features of my invention, the auxiliary tank connection being broken and the tank and engine being omitted. The structure is there shown in initial position.

Fig. 3 is a side elevation view of the cylinder and compound lever parts shown in the operative position or applying the brakes by the vacuum means a part of bracket 8 and valve 23 being broken away.

Fig. 4 is an enlarged detail side elevation view with the parts of the pedal lever and support broken away with the vacuum cylinder and piston shown in vertical longitudinal section.

Fig. 5 is an enlarged detail horizontal sectional view through the control valve for the vacuum cylinder, taken on line 5—5 of Figs. 2, 4, 6, and 7, the reduced end of the control valve being shown in full lines.

Fig. 6 is an enlarged detail transverse sectional view taken on line 6—6 of Figs. 2, 4 and 5, showing details of arrangement of the control valve and supporting slide rod.

Fig. 7 is a detail transverse sectional view through the control valve taken on line 7—7 of Figs. 2, 4 and 5.

Fig. 8 is an enlarged detail elevation view of the control valve taken on section line 5—5 of Figs. 2, 4, 6 and 7, that is, on the same section line as Fig. 5.

Fig. 9 is an enlarged detail sectional view on line 9—9 of Figs. 2 and 4 showing the crosshead on the slide rod for actuating the control valve.

The parts will be identified by their numerals of reference which are the same in all the views.

1 is a brake pedal of the usual form. 2 is the brake fulcrum. 3 is the brake rod connection connected to the brake equalizer 4 with both of its yokes 31 and 32 bifurcated. 5 is the floor board or part of the frame of the automobile. 6 is the pivot bracket for carrying one end of the compound lever mechanism. The other end of the compound lever means is carried on fulcrum 2 of brake pedal 1. 7 is the vacuum cylinder for actuating the parts, being provided on its head 71 with a bracket 8 which is pivoted at 9 to the brake connection for the pedal lever 1.

The first lever member of the compound lever mechanism is the foot lever or pedal 1. It is fulcrumed at 2 and has its pedal brake connection at 9. The other lever member of this compound lever combination is the lever arm 13 which is fulcrumed on the brackets 6 at 61. Power is applied at the pivot 121. The brake connection 32 is pivoted at 131. Yoke 171 is pivoted at 18.

10 is a trunk piston provided with a cup extension 101 and with suitable packing 102. This is provided with a connecting yoke 103. 11 is the cylinder head slotted at 111 for the accommodation of the pitman. 12 is the pitman connected to the yoke 103 by pivot 104.

13 is a lever member or part of the compound lever fulcrumed at pivot 61 on the bracket 6 and pivotally connected at 121 to the pitman 12. The lever 13 is made of a pair of stampings disposed at each side of the pitman 12 and bracket 6. The brake rod connection yoke 32 is bifurcated and connected by pivot 131 to the lever 13.

Cylinder 7 is provided with a supporting band 72 which is provided with a supporting bracket 14 and is retained in place by pinch bolt 73. A corresponding bracket 15 is provided on the cylinder head 71. Through brackets 14 and 15 is disposed the actuating slide rod 16 which is provided with yoke 17 which is connected by riveted pivot 18 to the lever member 13 of the compound lever mechanism. The yoke loops down at 171 to accommodate the fulcrum pin 131 and permit the pivots 101 and 18 to swing into alinement and pass each other, as seen in Fig. 4. It will be further noted that the pivotal connection 131 is an advance of the line through the centers of pivots 121 and 61. The result is that when the brake is applied as seen in Fig. 3, the full power of the lever 13 is exerted, the pivot 131 swinging up toward the dead center of pivot 61, which gives the advantage to the action of the piston at the end of its stroke to exert strong pressure on the brake connection 31. The slide rod 16 is adjustably screw threaded into the yoke 17 and retained by lock nut 161. A screw threaded stop nut 162 is at the outer end and limits the movement of the slide rod 16 in the supporting lugs 14 and 15. The crosshead 19 is secured to slide rod 16 by clamp screw 191. (When the vacuum means fails, the pull is on stop nut 162 direct.)

A return spring 20 is interposed between the lug 14 and the crosshead 19 to force the parts to initial position. Guide pin 21 is carried by bracket 14 and engages the transverse hole 192 in the crosshead 19 to guide the same in position.

It will thus be seen that the cylinder 7 is supported on the slide rod 16 and that the parts are relatively movable on each other so that when the piston 10 reciprocates in the cylinder 7 by reason of its connections, the actuation of the brake is secured by the operation of the cylinder after the same has been initiated by the operation of the pedal or lever.

The cylinder is controlled by the control piston valve 22 in the valve casing 23. The valve 22 is a double hollow reciprocating piston valve. The valve casing 23 is provided with a series of cross ports 24 which are closed by the main body of the valve 22 when the valve is operated to insure the action of the vacuum and permit air to enter to break the vacuum when the valve is closed. The end of the valve 22 is tapered and is reduced in diameter at 221 and provided with a seat which in practice is about $\tfrac{3}{32}$ of an inch long to permit that much movement of the valve to cut off and close the cylinder before the action of the vacuum, the valve casing being correspondingly reduced forms a double valve seat. The shoulder portion of the valve towards the reduced end is preferably at a different angle from the shoulder in the valve casing 23 to provide an open annular port space and through the shouldered portion of the valve 22 are cross perforations 222 delivering into the central bore of the valve.

The valve casing is carried by the supporting lug 15 which is longitudinally bored at 151 to receive the same. The valve casing 23 is shouldered at 231 and a cap 232 is screw threaded into the end of the casing to clamp the same to the lug 15. A transverse bore 233 (shown in Figs. 5 and 6) provides valve port into the vacuum cylinder 7, the bore being extended through the lug 15.

A tapered set screw 25 is through the lug 15 with an engaging pin 251 to engage the bore 233 for seating the parts and preserving the alinement. Further, set screw 25 is a plug for an oil hole and the structure is oiled through this aperture. Compression spring 26 forces the valve to its seat, the shoulder at the end of the valve being stopped against the corresponding shoulder in the casing.

The valve stem 27 connects at its inner end to cross pin 271 and extends to and connects crosshead 19, which controls the said valve. This valve stem 27 is a comparatively light wire and fits closely in the elongated bushing 28 carried by the clamp screw 232. As the diameters are small it is unnecessary to provide packing as the leakage is negligible.

The valve casing 23 is connected by pipe 29 to vacuum tank or chamber 292. Tank 292 is connected through pipe 30 to manifold 301. A check valve 302 is in the pipe 30 and opens towards the manifold. The vacuum chamber or tank 292 gives large capacity and provides vacuum at all times for use with vacuum cylinders, enabling the use of large bore. The vacuum is ready for manipulations whether the engine is running or not.

With the parts thus enumerated I will indicate the operation. The initial position is illustrated in Fig. 2. The operated or applied position is illustrated in Fig. 3. Fig. 4 may be an intermediate position with brake partially applied. However, the brake may be fully applied at that point, depending on the condition of the brake lining.

In operation, pressure is applied on the foot pedal 1 gradually and because of the connection through the pivot 9 and the bracket 8 to the cylinder 7, the cylinder 7 is actuated and the lugs 14 and 15 tend to slide on the slide rod 16. This permits the valve casing 23 to be carried away from the valve 22 and the large body of the valve 22 at once closes the vent ports 24. The reduced portion 221 of the valve, after the traverse of $\tfrac{3}{32}$ of an inch, begins to gradually open and permit the action of the vacuum through the pipe 29 which, of course, exerts its pull upon the piston 10 which acts through pitman 12 on lever arm or member 13 and through connection 31 pulls on the brake equalizer 4 and begins the application of the brake.

If the pressure is applied to the foot lever gradually, the operation of the vacuum cylinder tends to react upon and carry the slide rod 16 in the same direction, so that as the pressure is applied gradually, the parts move in unison and apply the brake gradually until the lug 15 finally strikes the stop 162 on the slide rod 16, when the action of the vacuum means continues to draw the piston 10 until, through the connection 12, the brake has been fully applied.

If it is desired to apply the brake quickly, the pedal lever 1 is pushed over quickly to the limit of its movement and the full action of the vacuum cylinder is secured at once. It will be observed that if the pedal is only partially moved over, the action of the piston 10 follows up to that point and the valve will be closed and the action of the brake stopped at any point desired, so that the brake is applied according to the judgment and skill of the operator.

I desire to remark also that in the event the vacuum power cylinder is not operating, my improved structure operates directly by the operation of the brake pedal, which pulls lug 15 against stop 162, applying power direct. The movements of the other parts are negligible so far as the result in applying the brake is concerned.

I have described my invention in its preferred form and in its preferred application. It can, of course, be very greatly varied in its application to a brake mechanism. To understand this, consider a clutch pedal in place of pedal 1 and that rod 32 connects to a clutch. I merely wish to claim here, aside from the broad invention, the species relating to brake mechanism.

Having thus described my invention, what I claim as new and desire to secure by Letters Patent, is:

1. In a vacuum brake mechanism for automobiles, the combination with a pedal lever and its fulcrum and brake connection pivot of a brake rod and its yoke connections, an intermediate fulcrum bracket adapted to be carried by a part of the automobile, a vacuum tank, a vacuum cylinder with connection to the said tank, a cylinder head bracket connected to the said brake connection pivot, a simple lever member fulcrumed at its upper end on the said intermediate fulcrum bracket, a trunk piston in the said vacuum cylinder having a pitman connection to said simple lever member, the said lever elements and connections comprising a compound lever mechanism, a slide rod, brackets on the cylinder heads with apertures for said slide rod to have relative reciprocatory movement, a curved yoke connection on the said slide rod to the said simple lever member of compound lever mechanism, said yoke being conformed to permit the alinement of the lever pivots with the said slide rod and brake pivot and connection, a crosshead on the said slide rod, a spring interposed between the crosshead and one of said slide brackets for holding the parts yieldingly in initial position, and a piston valve structure comprising a seat and piston valve connected to said crosshead with air ports and vacuum ports, said piston valve having reduced tapered end portion and having double valve seats, the larger of which shuts off the air ports, and the smaller of which controls the vacuum ports, the said valve being timed so that on the manipulation of the pedal lever the air connection is first cut off and the gradual control of the vacuum connection is accomplished by the relative manipulation of the pedal lever.

2. In a vacuum brake mechanism for automobiles, the combination with a pedal lever and its fulcrum and brake connection pivot of a brake rod and its connections, an intermediate fulcrum bracket adapted to be carried by a part of the automobile, a vacuum tank, a vacuum cylinder with connection to said tank, a cylinder head bracket connected to the said brake connection pivot, a simple lever member fulcrumed at its upper end on said intermediate fulcrum bracket, a trunk piston in said vacuum cylinder having a pitman connection to said simple lever member, the said lever elements and connections comprising a compound lever mechanism, a slide rod, brackets on the cylinder heads with apertures for said slide rod to have relative reciprocatory movement, a curved yoke connection on the said slide rod to the said simple lever member of compound lever mechanism, said yoke being conformed to permit the alinement of the lever pivots with the said slide rod and brake pivot and connection, a crosshead on the said slide rod, a spring interposed between the crosshead and one of said slide brackets for holding the parts yieldingly in initial position, and a piston valve structure comprising a seat and piston valve connected to said crosshead with air ports and vacuum ports, said piston valve having reduced tapered end portion and having double valve seats, the larger of which shuts off the air ports, and the smaller of which controls the vacuum ports, the said valve being timed so that on the manipulation of the pedal lever the air connection is first cut off and the gradual control of the vacuum connection is accomplished by the relative manipulation of the pedal lever.

3. In a vacuum brake mechanism for automobiles, the combination with a pedal lever and its fulcrum and brake connection pivot of a brake rod and its connections, an intermediate fulcrum bracket adapted to be carried by a part of the automobile, a vacuum tank, a vacuum cylinder with connection to said tank, a cylinder head bracket connected to the said brake connection pivot, a simple lever member fulcrumed at its upper end on said intermediate fulcrum bracket, a trunk piston in said vacuum cylinder having a pitman connection to said simple lever member, the said lever elements and connections comprising a compound lever mechanism, a slide rod, brackets on the cylinder heads with apertures for said slide rod to have relative reciprocatory movement, a curved yoke connection on the said slide rod to the said simple lever member of said compound lever mechanism, said yoke being conformed to permit the alinement of the lever pivots with the said slide rod and brake pivot and connection, a crosshead on the said slide rod, a spring interposed between the crosshead and one of said slide brackets for holding the parts yieldingly in initial position, and a piston valve structure comprising a seat and piston valve connected to said crosshead with air ports and vacuum ports.

4. In a vacuum brake mechanism for automobiles, the combination with a pedal lever and its fulcrum and brake connection pivot of a brake rod and its connections, an intermediate fulcrum bracket adapted to be carried by a part of the automobile, a vacuum tank, a vacuum cylinder with connection to said tank, a cylinder head bracket connected to the said brake connection pivot, a simple lever member fulcrumed at its upper end on said intermediate fulcrum bracket, a trunk piston in said vacuum cylinder having a pitman connection to said simple lever member the said lever elements and connections comprising a compound lever mechanism, a slide rod, brackets on the cylinder heads with apertures for said slide rod to have relative reciprocatory movement, a curved yoke connection on the said slide rod to the said simple lever member of said compound lever mechanism, said yoke being conformed to permit the alinement of the lever pivots with the said slide rod and brake pivot and connection, a crosshead on the said slide rod, a spring interposed between the crosshead and one of said slide brackets for holding the parts yieldingly in initial position, and a double ported valve connected to said crosshead to vent said cylinder and control the vacuum connection.

5. In a vacuum brake mechanism for automobiles, the combination with a pedal lever, its fulcrum and brake connections, of an intermediate fulcrum bracket carried by a part of the automobile, a vacuum tank, a vacuum cylinder with connection to the said tank, a manifold connection to said tank, a check valve in the said manifold connection seating away from the manifold, means for supporting the said cylinder in operative position on said pedal lever, a lever member fulcrumed to the said intermediate fulcrum, a piston within the said cylinder, and connections therefrom to the last aforesaid lever member, a pivotal connection to the brake connections, the said pedal lever, lever member and connections constituting a compound lever mechanism.

6. In a vacuum brake mechanism for automobiles, the combination with a pedal lever, its fulcrum and brake connections, of an intermediate fulcrum bracket carried by a part of the automobile, a vacuum tank, a vacuum cylinder with connection to the said tank, means for supporting the said cylinder in operative position on said pedal lever, a lever member fulcrumed to the said intermediate fulcrum, a piston within the said cylinder, and connections therefrom to the last aforesaid lever member, a pivotal connection to the brake connections, the said pivotal lever, lever member and connections constituting a compound lever mechanism.

7. In a vacuum brake mechanism, the combination with a pedal lever, its fulcrum and brake connections, of an intermediate fulcrum bracket carried by a part of the automobile, a vacuum cylinder, means for supporting the said cylinder in operative position on said pedal lever, a lever member fulcrumed to the said intermediate fulcrum, a piston within the said cylinder, and connections therefrom to the lever member.

8. In a brake mechanism for automobiles, the combination with a pedal lever, of brake rod connections, a vacuum cylinder with actuating piston therein, pivotal bracket means for supporting the said cylinder on the pedal lever, and a lever member connection from the piston to the said brake rod connections, the said elements constituting a compound lever mechanism.

JESSE B. BROWN.